United States Patent
Morando

[11] Patent Number: 6,161,337
[45] Date of Patent: Dec. 19, 2000

[54] WINDOW-REGULATOR MODULE FOR A MOTOR-VEHICLE DOOR WHEREIN A LOWER END OF A SLIDER PROJECTS BEYOND A LOWER END OF AT LEAST ONE RAIL

[76] Inventor: Patrick Morando, 83 route de la Gaude, 06800 Cagnes sur Mer, France

[21] Appl. No.: 09/013,046

[22] Filed: Jan. 26, 1998

[30] Foreign Application Priority Data

Jan. 24, 1997 [FR] France ................... 97 00790

[51] Int. Cl.$^7$ ............... E05F 11/48; E05F 11/38; B60J 1/17
[52] U.S. Cl. ................. 49/352; 49/348; 49/375
[58] Field of Search ................ 49/348, 349, 352, 49/375, 350

[56] References Cited

U.S. PATENT DOCUMENTS

| | | | |
|---|---|---|---|
| 4,406,089 | 9/1983 | Koch et al. | 49/352 |
| 4,984,386 | 1/1991 | Marscholl et al. | 49/352 |
| 5,074,077 | 12/1991 | Toyoshima et al. | 49/352 |
| 5,226,259 | 7/1993 | Yamagata et al. | |
| 5,251,403 | 10/1993 | Compeau et al. | |
| 5,469,656 | 11/1995 | Gier et al. | 49/28 |
| 5,528,861 | 6/1996 | Beyerlein | 49/352 |
| 5,564,230 | 10/1996 | Periou | 49/349 |
| 5,623,785 | 4/1997 | Maiel | 49/352 |
| 5,657,580 | 8/1997 | Kobrehel | 49/352 |
| 5,694,717 | 12/1997 | Gier | 49/352 |
| 5,740,630 | 4/1998 | Medebach | 49/352 |
| 5,778,599 | 7/1998 | Saito | 49/375 |
| 5,778,600 | 7/1998 | Chu | 49/352 |
| 5,809,695 | 9/1998 | Strickland | 49/352 |

FOREIGN PATENT DOCUMENTS

| | | |
|---|---|---|
| 0 286 923 | 3/1988 | European Pat. Off. |
| 0 350 954 | 7/1989 | European Pat. Off. |
| 0 405 159 | 5/1990 | European Pat. Off. |
| 0 694 427 | 1/1996 | European Pat. Off. |
| WO94/03341 | 2/1994 | WIPO |

*Primary Examiner*—Blair M. Johnson
*Assistant Examiner*—Gregory J. Strimbu
*Attorney, Agent, or Firm*—Lowe Hauptman Gopstein Gilman & Berner

[57] ABSTRACT

A window-regulator module comprises at least one rail on which slides at least one slider supporting a window. Cables and a drive motor drive the slider. The slider includes a sliding part complementary to the at least one rail with a lower end of the slider including a supporting surface for the window. At the lower end of the stroke of the slider, a lower edge of the window projects by a specified distance beyond the lower edge of the rail.

23 Claims, 5 Drawing Sheets

WINDOW-REGULATOR MODULE FOR A MOTOR-VEHICLE DOOR WHEREIN A LOWER END OF A SLIDER PROJECTS BEYOND A LOWER END OF AT LEAST ONE RAIL

TECHNICAL FIELD

The present invention relates to a window-regulator module for motor-vehicle doors.

BACKGROUND OF THE INVENTION

It is known in the automotive industry to locate a module inside the vehicle door. This module supports the window and the window regulator and is mounted into the vehicle door.

A door configuration is known which consists of a shell extending at its upper part into a frame receiving the window. The term "window" as used herein also means the glass pane. The outer sheetmetal of the shell forms the external door panel. This external panel is rigidly joined to an inner panel comprising two apertures separated by a door brace. The brace of the inner panel is concave toward the door shell inside in order to match the shape of the protruding module.

The patent application WO 94 03341 filed by applicant describes a molded plastic module housed in such a door configuration. This module comprises a rail on which a window-regulator slider moves vertically, and further a window guide for a side edge of the window. The rail and the guide also are made of plastic and are rigidly joined to the body of the module. The slider is driven into translation along the rail by a cable actuated by a motor housed in the body of the module. The module is inserted by its upper part into the vehicle door, with the rail facing toward the vehicle outside. The upper ends of the rail and of the guide are inserted upward into seats between the inner and outer panels of the door shell. Thereafter the lower part of a cassette is pivoted toward the door inside in order that the lower ends of the rail and of the guide in turn shall enter the inside of the module. Next the window is inserted into the guide and affixed to the slider. Lastly the module is affixed to the inner door sheetmetal at affixation points near the ends absorbing the main forces. The protruding part of the module located on the side bearing the window is housed in the space cleared on account of the concavity of the brace.

Increasingly vehicle design requires larger window surfaces. The higher the window, the longer must be the rail and the module guide: the rail of the window module must thereby be extended downward to allow the window to be lowered as much as possible between the two door panels. If the rail is inadequately extended, the window will not fully descend into the lower door portion. Hence it will be impossible to fully open the door frame.

However, if the rail length were overextended, the module no longer can be installed into the door shell fitted with a brace. The upper ends of the rail and the guide may be inserted upward into the seats between the inner and outer panels of the door shell. However, by pivoting the base of the module, the lower ends of the rail and the guide will hit the lower edge of the apertures of the inner panel of the shell. As a result, the lower rail end cannot be inserted into the shell seats provided for this purpose. The maximum rail length allowing mounting the module in the shell precludes descending as far as the lower shell limit. A distance of about 30 mm remains underneath the mounted module that is unavailable to further lower the window. The door structure cannot be modified, and a design to fit the module with telescoping rails would render the window regulator more complex.

U.S. Pat. No. 5,226,259 describes a door design and a window regulator integrated into this door structure. The window regulator module is integrated into a truss in the shape of the door contour from the lower edge to the upper frame. This module comprises two metal rails parallel to the side edges of the door on which slide window supports on skids or sliders. The truss includes the window regulator and is sandwiched between an outer and an inner panel.

In this door design, the window can be lowered as far as the lower door end. However such a design is inappropriate to a molded plastic module because it would degrade the mechanical strength of the inner body of the door. Also, such a window regulator modifies and complicates the door structure, entailing a large number of parts and complex assembly.

U.S. Pat. No. 5,251,403 describes a molded plastic module comprising vertical guides associated to the side edges of a window. The module also comprises two metal arms which are mounted to subtend together an X shape and pivot one on the other. Each of the lower ends of the two arms comprises a roller sliding in a horizontal rail riveted into the window near its lower edge. One arm, namely the support arm, is driven in rotation about its upper end which is affixed to the module. The upper end of the other arm, namely the regulating arm, comprises a skid or slider sliding in a slot of the module body. Depending on the direction of rotation of the support arm, the lower ends of the two metal arms sliding in the rail will drive this rail and hence the window upward or downward.

However this kind of module must be mounted into a modified door structure lacking a central brace: the two metal arms cannot be inserted into the shell or only by means of complex assembly. Furthermore, the module configuration per se requires a large number of parts and cannot be molded integrally.

SUMMARY OF THE INVENTION

Accordingly it is the object of the present invention to remedy the drawbacks of the prior art by proposing a module for a motor-vehicle door fitted with a window regulator designed for large windows and allowing easy mounting on braced shell doors.

Another object of the present invention proposes a simple design for a motor-vehicle door module which may be molded.

Another object of the present invention is a stop means for sliders that is more resistant to repeated operation.

These and other objects are met by the present invention that provides a motor-vehicle window-regulator module which comprises at least one rail on which slides a window-supporting slider and slider drive-means, each slider comprising a sliding part which is complementary to the rail, a lower end of the slider comprising means to hold and affix the window, a lower window edge being a distance away from the upper end of the sliding part of the slider in such manner that at the end of the slider excursion, the lower window edge projects by a specific distance beyond the lower rail end.

In another feature of the invention, the module and the rails are integrally made of molded plastic.

In another feature, the window-supporting slider consists of two side walls connected at their lower ends by a support surface constituting a substantially U-shaped base, the side walls and the slider base constituting the window holding and affixing means, the window being vertically received between the two slider side walls, the lower window edge resting on the slider base, one slider side wall being fitted with a vertical channel constituting the chariot's sliding part, the upper end of the sliding part comprising a step with which to hit a stop at the end of the slider's excursion at the lower end of a rail.

In another feature, the means driving the slider consist of at least one sheathless cable connected to the slider and driven by a motor, the slider being fitted with elastic play cancelling means.

In another feature, the slider drive means consist of at least one cable connected to the slider and fitted with a sheath elastically cancelling play.

In another feature, the window supporting slider consists of two side walls connected at their lower ends by a base-forming support surface in such manner as to substantially form a U, the side walls and the slider base constituting the window support and affixation means, the lower window edge resting on the slider base, one upper end of a slider side wall comprising a step constituting the slider's sliding part.

In another feature of the invention, the module comprises a damping stop in the vicinity of the lower end of at least one rail.

In another feature, the damping stop consists of a component having a transverse borehole, the stop being rotatable about a fastening rod inserted into the borehole and perpendicularly seated in the module side bearing the rails, the stop comprising a stop surface located near the lower rail end at the end of the downward excursion, the lower end of the slider step impacting the stop surface.

In another feature, the module comprises elastic means cooperating with the stop to oppose stop rotation in the direction associated with the slider downward motion.

In another feature, the stop is fitted at its periphery with a rest surface and the elastic means are a compression spring applying pressure to the stop's rest surface so as to slightly lift the stop surface toward the top of the rail and to oppose stop rotation when the sliding slider part impacts the stop.

In another feature, the damping stop also constitutes a lower rail pulley.

In another feature, the damping stop comprises a seat receiving a pivotable pulley, the stop being fitted with a notch to receive the cable transmitting the forces lowering the skid, the cable sliding in the notch and then passing over the pulley seated in the stop.

In another feature, the peripheral surface of the pulley/damping-stop located at the base of the module is curved and fitted with a notch following the curved stop contour and is located in a plane substantially parallel to the plane of the path of the slider on the rail to guide the lowering cable of the slider sliding in the notch of the pulley-stop.

In another feature of the invention, the elastic means opposing the stop rotation in the direction associated with the slider downward motion consist of a tension spring affixed by one end to the module and by its other end to the stop.

In another feature, the module comprises rotation-limit stops for the pulley-stop in the direction opposite the direction associated with the slider downward motion.

In another feature, the rotation-limit stops of the pulley-stop are elastic.

In another feature, each slider comprises two vertical seats for the lowering cable and for the lifting cable of the slider, the seat for the lifting cable being fitted with second elastic means cooperating with the cable end when the slider is being pulled toward the top of the rail.

In another feature, the seats for the lowering and lifting cables are fashioned in the slider step and the flange-fitted wall respectively, the two seats being located in a plane substantially perpendicular to the slider's side walls.

In another feature, the seats of the lowering and lifting cables each consist of a hole continued by an issuing conduit of a dimension corresponding to that of the cable, holes and conduits being concentric and at their junction forming a shoulder respectively downward and upward, the second elastic means consisting of a compression spring inserted into the hole of the lifting cable, each cable being inserted into its housing through the conduit, the lowering cable being fitted at its end with a part impacting the junction between hole and conduit when the cable is being pulled down and the lifting cable being fitted at its end with a part formed by a body continued by a head, the annular junction between body and head of the end part of the lifting cable compressing the spring in the hole of the lifting seat and driving the slider toward the top of the rail.

In another feature, the slider comprises a lateral clearance allowing decreasing the gap between the upper pulley of the system driving the cables and the slider as well as decreasing the gap between the upper pulley and the rail in a manner to limit the torque caused by tensioning the cables.

In another feature, the lifting cable is connected to the lower slider part and the lowering cable is connected to the upper portion of the slider.

In another feature the rail(s) is (are) metallic and mounted by the pulley shafts on the module, the pulley shafts being affixed to the sheetmetal of the vehicle door.

BRIEF DESCRIPTION OF THE DRAWINGS

Other features and advantages of the present invention are elucidated in the following description and in relation to the attached drawings.

DETAILED DESCRIPTION OF THE PREFERRED EMBODIMENTS

Figure 1:
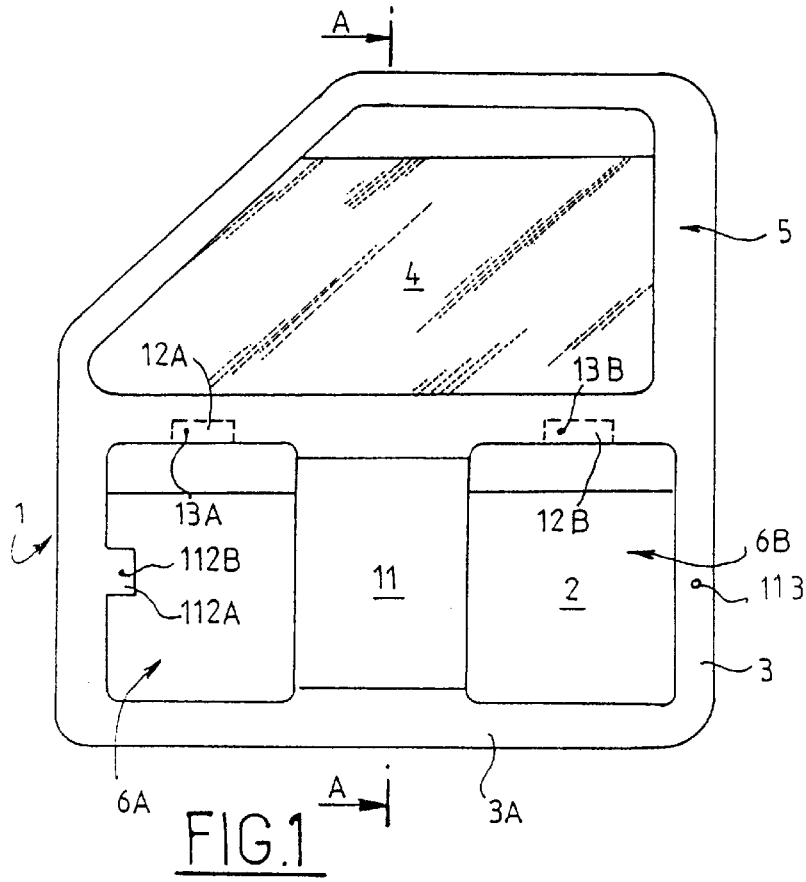
FIG. 1 is a view of a inner panel of a motor-vehicle door configuration.
Figure 2:
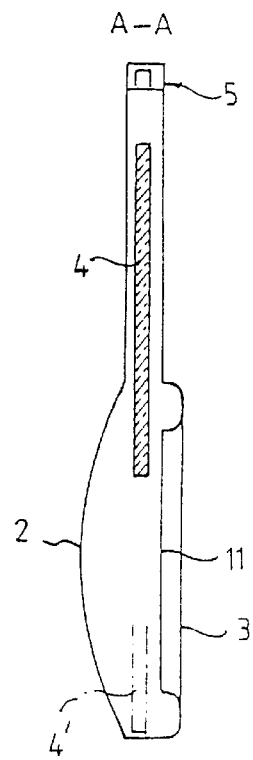
FIG. 2 is a cross-section taking along section line II—II of the door configuration of FIG. 1.

FIG. 1 is a view of an inner panel 3 of a metal or composite-material door configuration. Such a motor vehicle door includes a shell 1 continuing at its upper part into a frame 5 which receives a window 4. An outside sheetmetal of the shell constitutes an outer door panel 2. The outer door panel 2 is rigidly joined to the inner panel 3 comprising two apertures 6A, 6B separated by a brace 11. The brace 11 of the inner panel 3 is concave toward the inside of the door shell 1 (FIG. 2). This concave shape receives part of a substantially rectangular module 20 (FIG. 3) situated between two metallic rails 21, 22 supporting sliders 30, 31. The door shell 1 comprises rail housings 12A, 12B to receive the upper ends of the module rails. The rail housings 12A, 12B are present in each of the upper parts of the two apertures 6A, 6B between the inner and outer panels 3 and 2 respectively of the shell of the door 1. The housings 12A and 12B which receive the upper ends of the rails 21 and 22 each comprise a borehole 13A, 13B formed transversely in the inner panel 3 of the door 1. The non-concave side edge of the aperture 6B situated to the rear of the door comprises a borehole 113 at essentially mid-height of the aperture. This borehole is transverse to the inner panel of the shell 1. Lastly the non-concave side edge of the aperture 6A situated at the front of the door comprises a lug 112A, substantially at mid-height of the aperture. The lug 112A runs in the plane of the inner panel 3 and toward the center of the aperture and comprises a transverse borehole 112B. The four boreholes 13A, 13B, 113, 112B and the lug 112A of the side edge of the shell aperture 6A constitute four module affixation-sites to the shell 1. The number, shape and configuration of these affixation sites are not limited to the above described embodiment.

Figure 3:
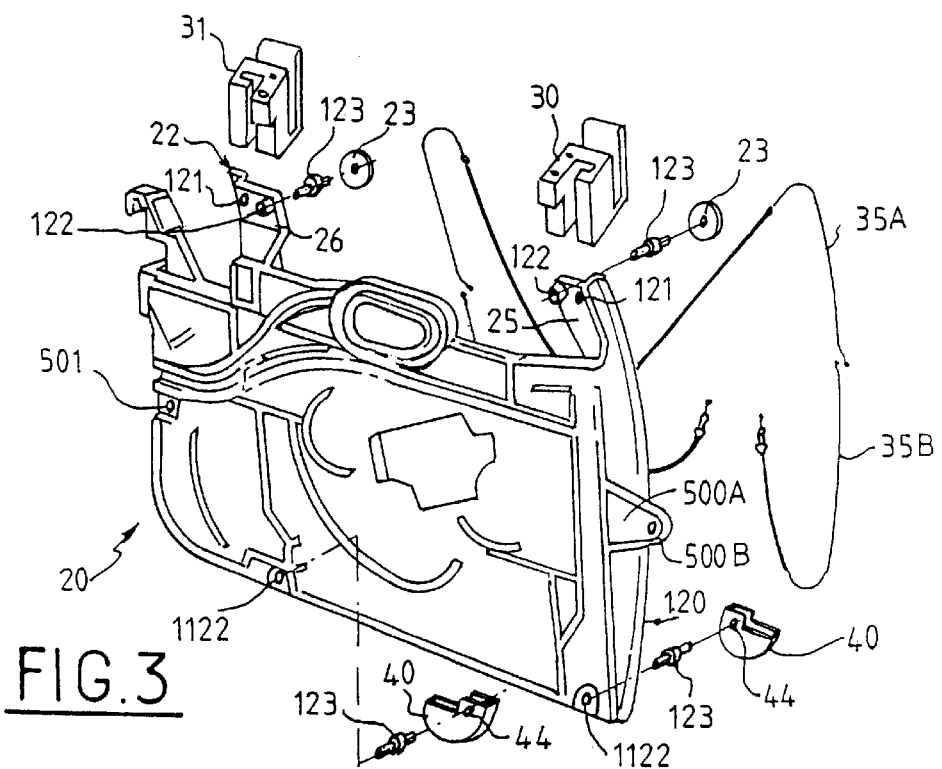
FIG. 3 is an exploded perspective view of a module of the invention.

FIG. 3 is a perspective view of a module 20 of the invention. The module 20 consists of a substantially rectangular molded-plastic panel. The longest edges of the module 20 are its upper and lower edges. A side 120 of the module 20 comprises the two vertical rails 21, 22. A seat 121 for an affixation screw is present in each of the upper ends of the module rails 21, 22. These two seats 121 are located opposite the boreholes 13A, 13B of the door shell 1 for connecting the module 20 to the door 1 using screws or clips. One side edge of the module 20 is fitted substantially centrally with an affixation lug 500A running sideways in a plane parallel to the rails 21, 22. This affixation lug 500A is fitted with a transverse borehole 500B. A second borehole 501 is present also in the other side edge of the module 20 and substantially at its middle. The transverse borehole 500B of the module's affixation lug 500A receives an affixation screw cooperating with the borehole 113 of the side edge of the aperture 6B situated to the rear of the door 1. Again the second borehole 501 of the other module side edge receives another screw or clips affixed into the borehole 112B of the lug 112A of the aperture 6A situated at the front of the door. Each rail 21, 22 runs vertically above the upper edge of the module 20. Sliders 30, 31 supporting the window 4 slide on a respective rail 21, 22. The omitted mechanisms implementing diverse door functions are mounted on the side of the module 20 devoid of rails. The mechanisms driving cables 35A, 35B (FIG. 4) transmit their lifting or lowering forces to the sliders 30, 31 and are mounted on the side 120 of the module 20 which bears the rails. When installing the module 20 in the door, the protruding components situated between the rails 21, 22 will seat themselves in the concave region of the brace 11 of the door 1.

The assembly of the module 20 into the door shell 1 may be carried out as follows: the module 20 is inserted by its upper part into the motor-vehicle door with the rails pointing outwardly. The upper ends of the rails 21, 22 are inserted upward into the housings 12A and 12B between the inner and outer panels 3 and 2 of the door shell 1. Simultaneously the module affixation lug 500A is inserted at the rear of the door between the inner and outer panels 3 and 2 of the door shell 1. Next the lower part of the module 20 is pivoted toward the inside of the door 1 so that the remainder of the module 20 now enters the inside of the shell 1. In this manner the side edge of the module 20 fitted with the second borehole 501 comes into position behind the lug 112A of the aperture 6A situated at the front of the door. The module 20 may be affixed in known manner, for instance using screws or clips, in the door shell 1.

Figure 5:
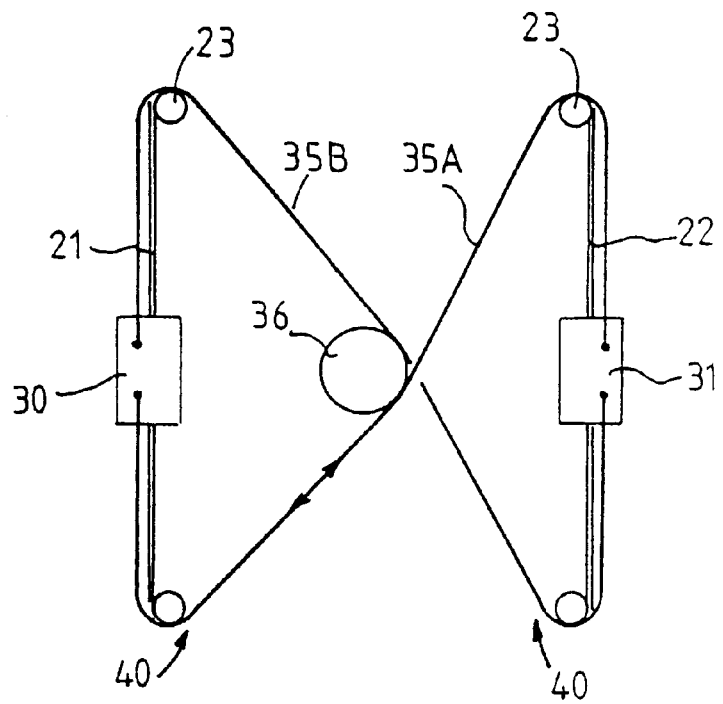
FIG. 5 is a functional diagram of the system driving the window-support sliders.
Figure 7:
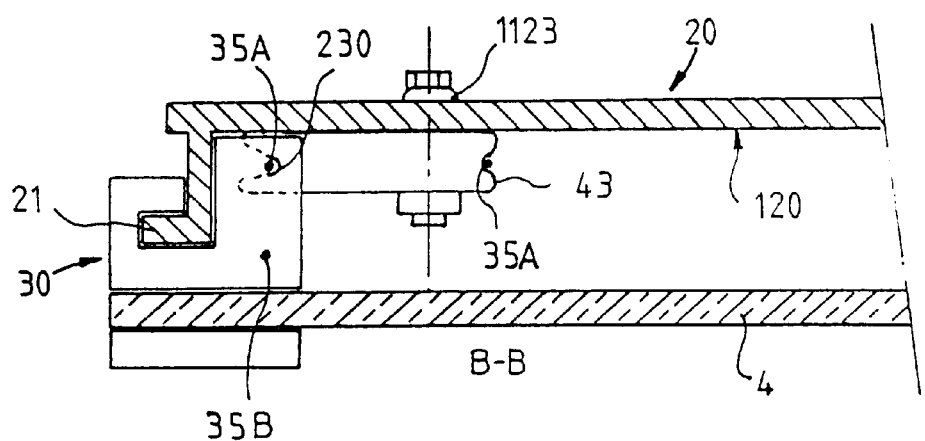
FIG. 7 is a view taken along section line VII—VII of FIG. 6 with a window being mounted on the sliders.

The side 120 fitted with the rails 21, 22 is installed facing away from the motor-vehicle. In this manner and for the sake of simplification, hereafter the "side 120 of the module fitted with rails" shall be termed "outer module side" or "outer side". A first vertical rail 21 is present at the side edge of the outer side of the module 20 which is fitted with an affixation lug 500A. A second rail 22 is present on the same outer side 120 of the module 20, running parallel to the first rail 21 and being near the other side edge, namely the one comprising a borehole 501. The cross-section of each rail 21 and 22 is L shaped, and the rails are molded simultaneously with the module with one leg of the L parallel to and spaced from the outer side 120 of the module. The leg of the L which is parallel to the outer side of the module 20 extends away from the center of the module 20. This rail design is in no way restrictive and the rail may assume any other known shape. Illustratively the rails 21, 22 may have cross-sectional T or Y shapes. Each of the rails 21, 22 runs vertically above the upper edge of the module 20. Those rail portions which extend above the module are formed on rail-supporting feet 25, 26 extending the height of the module 20. The rail-supporting feet 25, 26 are located in a plane parallel to the module outer side 120. In addition to the borehole 121 used to affix the module 20 in the door 1, a second borehole 122 is present in each of the upper ends of the rail supporting feet 25, 26. The second borehole 122 allow for the mounting of upper pulleys 23 for the cables driving the sliders 30, 31. Each of the upper pulleys 23 is mounted on a rail supporting foot 25, 26, the axis of rotation of the pulleys 23 being substantially perpendicular to the outer side 120 of the module 20. The module 20 also comprises two transverse boreholes 1122 near the lower edge of the module 20 each associated with a lower pulley 40. Each of the two boreholes 1122 is present substantially in vertical alignment with the boreholes 122 used to mount the upper pulleys 23. The lower pulleys 40 are mounted on the outer side 120 of the module 20. Shafts 123 ensure in a known manner that the pulleys 23, 40 are mounted freely rotatable on the shafts held in the transverse boreholes 122, 1122. In a known manner, the shafts of the pulleys 23, 40 are affixed to the sheetmetal of the door 1. The two upper pulleys 23 are mounted in a plane parallel to the plane containing the two lower pulleys 40, the plane containing the upper pulleys 23 being a slight distance from the outer side 120 of the module 20. This configuration of the upper pulleys 23 is made feasible by the curvature of the rail-support feet 25, 26. However this configuration of the upper pulleys 23 also may be implemented using more elongated mounting rods 123 fitted with a shoulder on their length against which the pulley 23 shall be positioned. A slider 30, 31 supporting the window 4 slides on a respective one of the rails 21, 22. The window 4 (FIG. 7) rests on the sliders 30, 31 on the outer side 120 of the module 20. The window 4 moves substantially parallel to the outer side 120 of the module 20. The two upper pulleys 23 and the two lower pulleys 40 guide two drive cables 35A and 35B (FIG. 5) of the two sliders 30, 31. The system driving the cables is known to the expert and a functional schematic of such a system is shown in FIG. 5. Each slider 30, 31 is linked to one of the two ends of each of the two cables 35A and 35B. Each cable passes over the upper pulley 23 of one of the two rails 21, 22 and simultaneously over the lower pulley 40 of the other rail 22, 21. The two cables 35A, 35B are mounted in such a way that they form a figure-eight and one of the two cables forms a loop around the shaft of a drive motor 36. The drive motor 36 winds one end of one of the two cables while the other is unwinding, or vice-versa, to drive each of the two sliders 30, 31 in the same direction, either up or down.

Each slider 30, 31 (FIGS. 3 through 8) supporting the window 4 consists of two rectangular and parallel side walls 30A, 30B. These two side walls 30A, 30B are connected at their lower ends by a base 30C to constitute substantially a U-shape. The base 30C constitutes a supporting surface for a window 4 housed between the two parallel walls 30A, 30B of the slider 30, 31. The lower part of the window 4 is vertically received between the two side walls 30A, 30B of the two sliders 30, 31. Thus this window 4 rests by its lower edge on the supporting surface 30C of the sliders 30, 31. The two side walls 30A, 30B of the slider 30 are of different thicknesses. The side wall 30A of the slider 30 is the thicker one and comprises a vertical channel 131 over the full height of the slider 30. The channel 131 is situated on the edge of the side wall 30A parallel to the window 4 and out of contact with the window 4. The channel 131 presents a cross-sectional contour complementary to the contour of the rail 21 in order that the slider 30 be able to slide on the rail. The side wall 30A fitted with channel 131 constitutes the sliding part of the slider 30 and thereby this wall hereafter shall be called the "sliding wall" 30A. The channel 131 assumes an L shape of which the first leg is perpendicular to the side walls 30A, 30B of the slider 30. The upper end of the sliding wall 30A comprises a parallelipipedic step 130. This step 130 is perpendicular to the sliding wall 30A and points to the outside of the U formed by the slider 30. The step 130 is formed by the upper end of the sliding wall 30A along the first leg of the L of the channel 131. In other words, the step 130 is on one side of the channel 131 which is between the step and the window 4. The step 130 of the slider 30 comprises a first vertical seat 230 for the end of the cable 35A transmitting the lowering forces to the slider 30. This first seat 230 consists of a cylindrical hole 230A in the upper surface of the step 130 of the slider 30. The cylindrical hole 230A continues towards the bottom of the slider 30 into a cylindrical conduit 230B of which the diameter corresponds to the diameter of the lowering cable 35A. The conduit 230B ends at the lower side of the step 130. The hole 230A and the conduit 230B are concentric and at their junction form a lower shoulder in the thickness of the step 130. The lowering cable 35A of the slider 30 is inserted into its seat 230 through the conduit 230B. A cylindrical part 135A (FIG. 8) is affixed to the end of the lowering cable 35A. The cylindrical part 135A is seated in the cylindrical hole 230A of the step 130. When the cable 35A is driven downward, the cylindrical part 135A is stopped against the bottom of the hole 230A and drives the slider 30 in its lowered direction. The cable 35A runs on downward and moves over the lower pulley 40 of the lower end of the rail 21. The sliding wall 30A of the slider 30 comprises a second vertical seat 1230 for the end of the cable 35B transmitting the lifting forces to the slider 30. The second seat 1230 is situated in a plane perpendicular to the side walls 30A, 30B of the slider and passing through the seat 230 of the lowering cable 35A. This second seat 1230 consists of a vertical cylindrical hole 1230A formed in the inner side of the wall 30A of the slider 30 near the slider base 30C. The cylindrical hole 1230A is continued upward in the thickness of the wall by a cylindrical conduit 1230B of which the diameter corresponds to that of the lifting cable 35B. The conduit 1230B ends at the upper end of the wall 30A of the slider 30. The hole 1230A and the conduit 1230B are concentric at their junction and form an upward stop in the thickness of the wall 30A of the slider 30. The stop is situated approximately at one-fourth the height of the slider 30 seen from the base 30C. A compression spring 330 is placed in the hole 1230A of the second seat 1230 to compensate for play in the driving mechanism. A part 135B composed of a cylindrical body continuing in a concentric cylindrical head is affixed to the end of the lifting cable 35B. The junction between the body and the head of the part 135B constitutes an annular stop. When the lifting cable is pulled upward the rail 21, the annular stop situated at the end of the cable 35B partly compresses the spring 330 in the cylindrical hole 1230A until the cylindrical body hits the stop. In this manner the slider 30 is pulled upward on the rail 21. The spring assures damping and cable-length adjustment. This feature precludes impacts when translating the window 4. This feature also may be implemented in known manner by fitting the cable ends with elastic means. The lifting cable 35B extends toward the top of the rail 21 and passes over the corresponding pulley 23. It should be appreciated that the upper pulleys 23 are not vertically above the lower pulleys 40 but are slightly away from the outer side 120 of the module 20. For that reason the two cable seats 230, 1230 are outside a plane parallel to the side walls 30A, 30B of the slider 30. Only the slider 30 sliding on the rail 21 located on one side edge of the module 20 fitted with an affixation lug 500A has been described above. However the other slider 31 and its rail 22 are substantially the same as the slider 30 and rail 21 and are symmetrical relative to a plane perpendicular to the outer side 120 of the module 20. The above described embodiment of the sliders 30, 31 in no way is limiting. For instance the four pulleys 23, 40 may be mounted in one plane parallel to the outer side 120 of the module 20. In such a design, the seats 230, 1230 for the lowering cables 35A and the lifting cables 35B shall be situated in the same plane parallel to the side walls 30A, 30B of the slider 30, 31. These cable seats 230, 1230 can be implemented in any known manner in the thickness of the sliding wall 30A of the slider 30 or in the step 130 of the sliding wall 30A.

Figure 4:
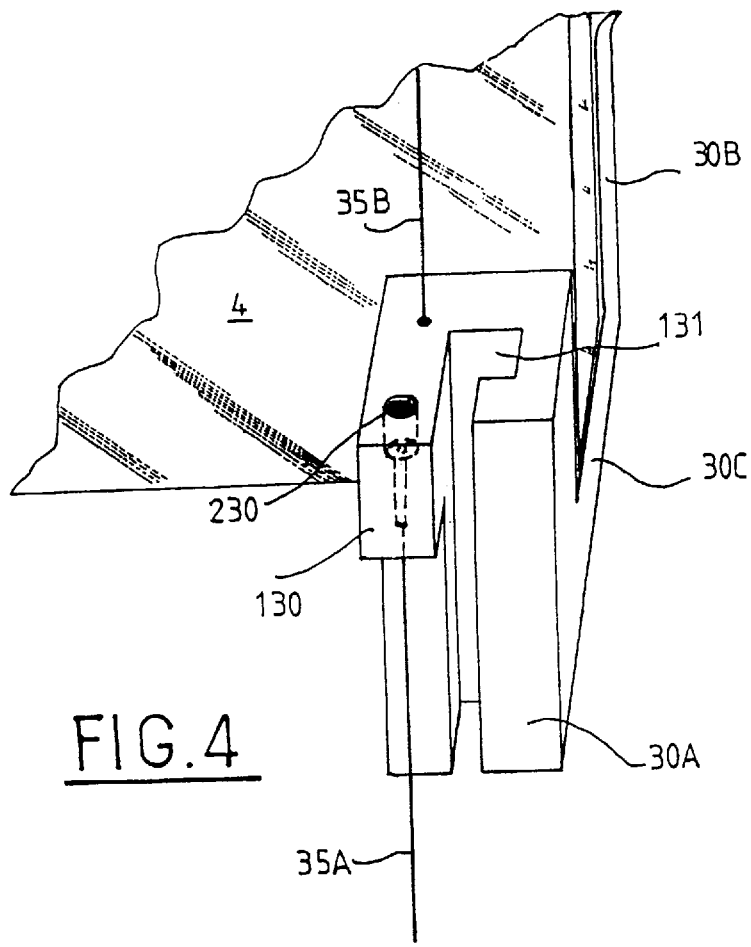
FIG. 4 is a perspective view of a lower edge of a window seated in a window-support slider of the invention.
Figure 8:
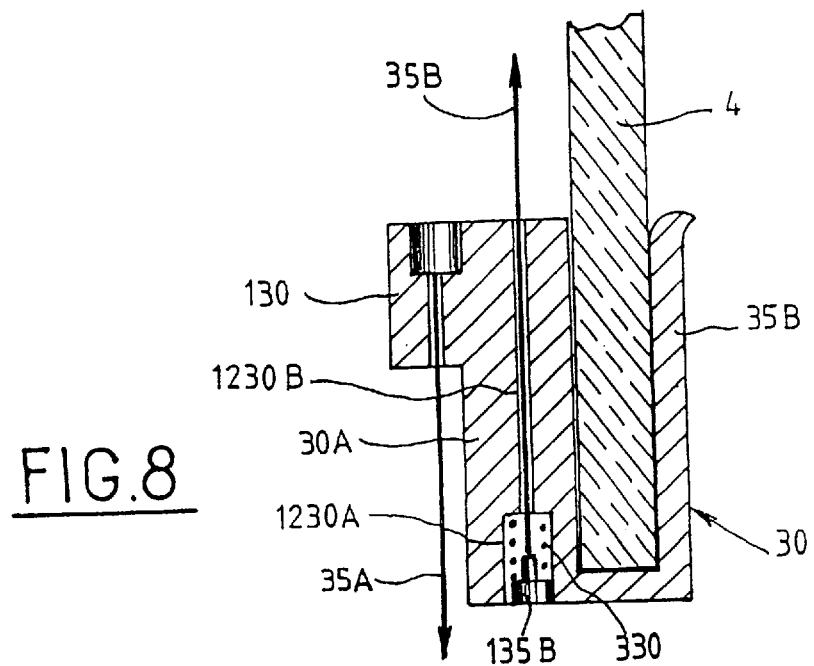
FIG. 8 is a sectional view of FIG. 4 taken along the section line VIII—VIII in a plane perpendicular to the window and passing through the window-support slider.
Figure 6:
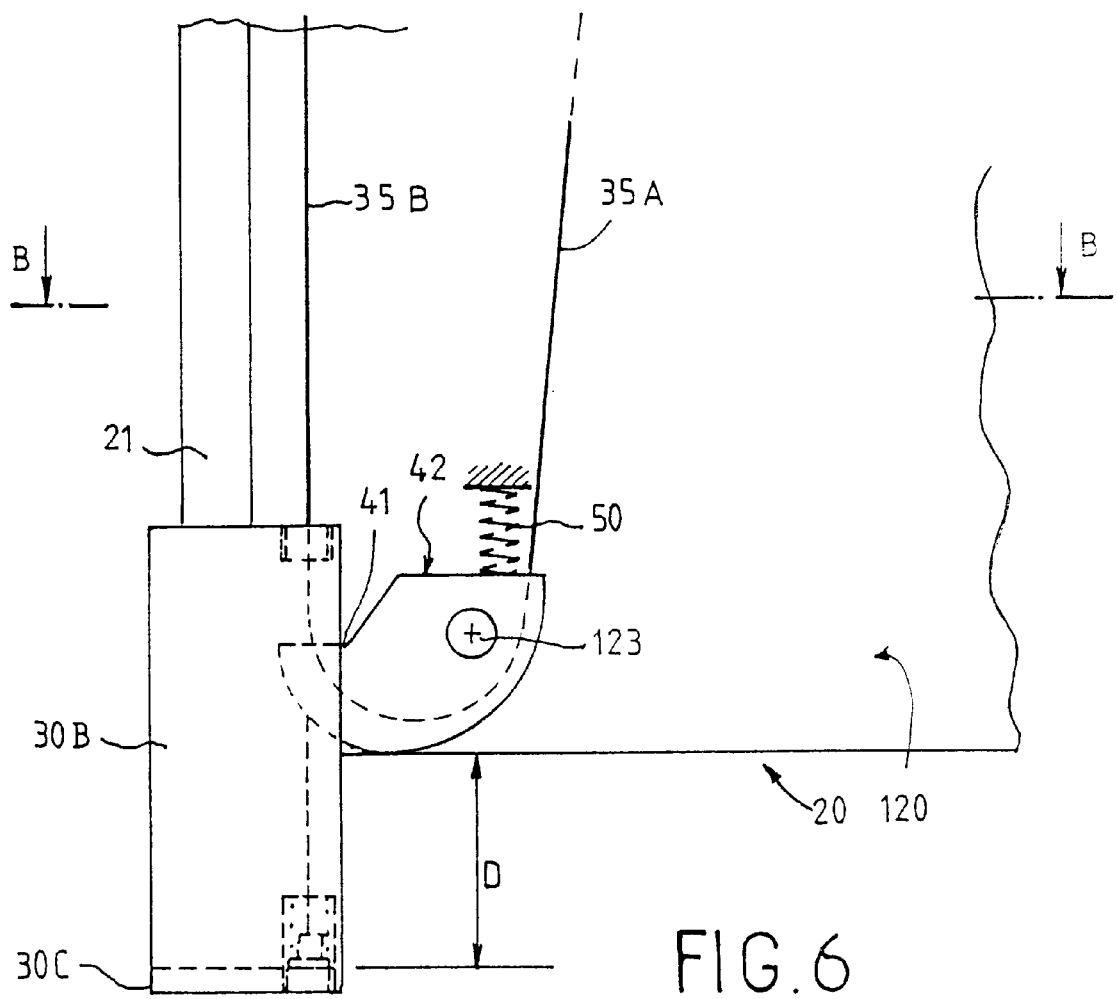
FIG. 6 is a front view of a pulley/lower-stop mechanism of the invention.
Figure 9:
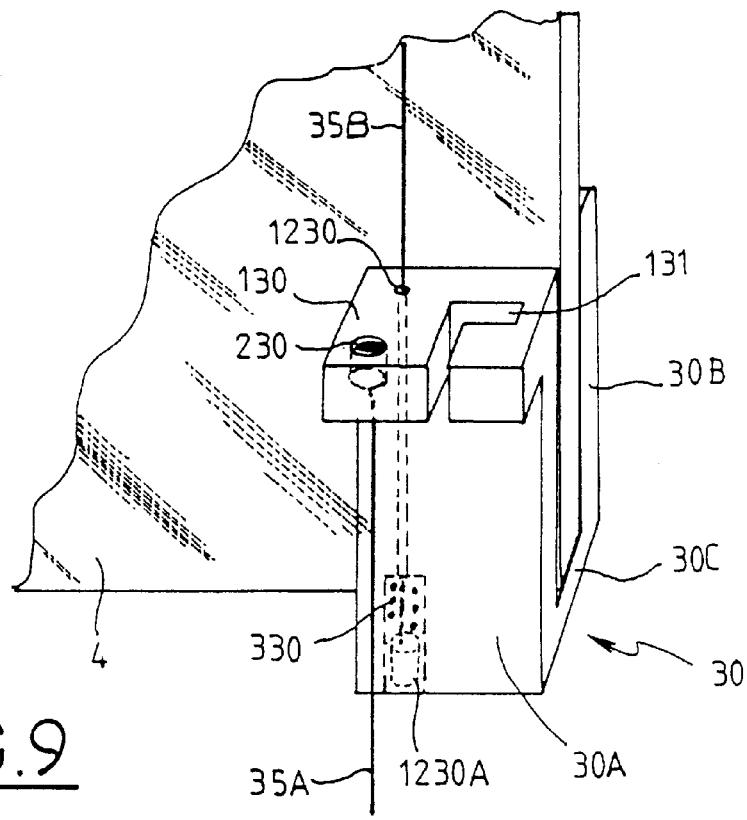
FIG. 9 is a perspective of a lower corner of a window mounted in a window-support slider for another embodiment of the invention.

FIG. 9 is a perspective view of a lower corner of a window 4 seated in a window-supporting slider 30 of another embodiment of the invention. In this latter embodiment, the channel 131 does not run over the full length of the slider 30. The channel 131 is present in a step 130 situated at an upper end of a side wall 30A. The step 130 is perpendicular to the side wall 30A over the full width of the side wall 30A. Elements identical with those of FIGS. 4 and 8 are denoted by the same numeric references. The lower stop pulleys 40 are affixed to the outer side 120 of the module 20, each near a lower corner of the module 20 and substantially in a vertical line with an upper pulley 23. The lower pulleys 40 are pivotably mounted on affixation rods 123. The pulley 40 which is located near the lower end of the other rail 22 of the module 20 may be identical or not with the stop pulley 40. The other and omitted pulley 40 in FIG. 6 is mounted in the same manner but symmetrically relative to a plane perpendicular to the outer side 120 of the module 20. The stop pulley 40 (FIG. 6) is integral and substantially assumes the shape of a half-disk. The lateral surface of the contour of the half-disk which is not curved include two parallel rectangular plane surfaces 41, 42 and form a step. The lower step surface 41 is called "stop surface", the upper step surface 42 is called "rest surface". The curved surface of the contour of the pulley 40 comprises a recess 43 passing a lifting cable 35A of the slider 30. The recess 43 substantially follows the circular contour of the pulley 40 and deepens the closer it is to the stop surface 41 of the pulley 40. The pulley 40 comprises a transverse cylindrical borehole 44. The axis of the borehole 44 lies substantially in the plane of the stop surface 41 of the pulley 40 and near the curved edge of the pulley 40. The borehole 44 serves to mount the pulley 40 on the affixation rod 123 and on the outer side of the module 20. The two plane sides 41, 42 of the pulley 40 face toward the top of the module 20, the stop surface 41 facing the rail 21. Illustratively a compression spring 50 affixed by one of its ends to the module 20, by means of its other end exerts a pressure on the rest surface 42 of the pulley 40 near the pulley's circular contour. In this manner the spring 50 tends to slightly raise this stop surface 41. The pulley 40 can slightly rotate about its affixation rod 123 but this rotation is restricted by the cable sliding in its recess. The upper pulleys 23 rotate about their axis of rotation, being driven by the lifting cables 35B whereas the lowering cable 35A slides in the recess 43 of the lower pulley 40. When the slider 30 is in the high position on the rail 21, the stop surface 41 of the lower pulley 40 is slightly raised relative to the lower end of the rail 21. When the lowering cable is driven downward on the rail 21, the slider 30 descends along the rail 21. When the slider 30 supporting the window 4 arrives at the lower end of the rail 21, at the bottom of the module 20, its excursion is stopped by the pulley's stop surface 41. The lower side of the parallelipipedic step 130 of the slider 30 hits the stop surface 41 of the pulley 40. The pulley 40 dampens this impact by slightly rotating about itself on the affixation rod 123 in the direction opposite that of the spring force. During this rotation, the pulley 40 drops slightly and accompanies the slider 30. Simultaneously the rest surface 42 of the pulley 40 is raised and compresses the spring 50, thereby ensuring damping. Such a stop allows repeated impacts by the slider 30 without danger of breakage. Accordingly the above described lower pulley 40 also fills the function of a damping stop. When the slider 30 reaches the end of its excursion at the bottom of the rail 21, its step 130 will rest on the surface of the stop 41. The U-shape structure of the slider 30 allows the slider base 30C to move underneath and beyond the lower end of the rail 21. In this manner the lower edge of the window 4 supported by the sliders 30, 31 is able to descend underneath the lower edge of the module 20 and to enter behind the lower door base strip 3A. In this manner the module can be easily mounted into the door shell 1. The lower edge of the window 4 will run by a specified distance D (FIG. 6) below the module 20. Illustratively this distance D may depend on the shape of the sliders 30, 31, that is, on the height of the parallel sides of the slider 30, 31 or on the thickness of the step 130 of the same slider. Therefore the full space available at the bottom of the shell 1 can be utilized to lower the window 4. The low position 4' of the lower window portion is shown in dashed lines in FIG. 2 being at the bottom of shell 1. The design of the sliders 30, 31 is not restricted to the above described embodiment. Illustratively the window 4 can be mounted by any other known means on the sliders. Similarly other embodiments of the lower stops are covered by the scope of the invention. Illustratively the above-described lower stop pulleys 40 may be replaced by pulleys identical with the upper pulleys 23. In such a case a stop of substantially the same configuration as the stop pulley described above can be mounted on the module or on the door near the lower end of the rail 21, 22. Similarly the stop can be mounted on the same affixation rod as a lower conventional pulley. Another possible design is to fit the lower end of one of the two rails 21, 22 with a stop pulley 40 of the invention, whereas the other lower end of the other rail comprises a conventional pulley. In the latter case one of the two sliders 30, 31 hits the stop 40 when arriving at the lower rail end. However, taking into account the above described drive system, when one of the rails is stopped, the other rail because of the action of the cable 35B also will stop. Moreover, thanks to the window weight and to the elastic means 50, 330 respectively of the stop and of the sliders, an adjustment is achieved and thereby the lower window edge remains horizontal.

Figure 10A:
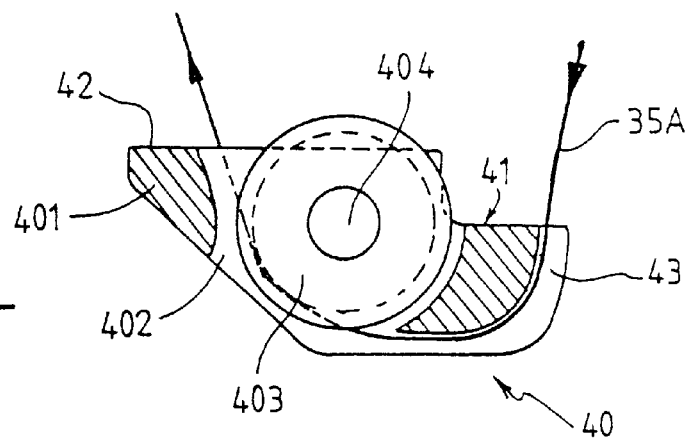
FIG. 10A is a longitudinal section in a plane of symmetry of a stop-fitted pulley for another embodiment of the invention.
Figure 10B:
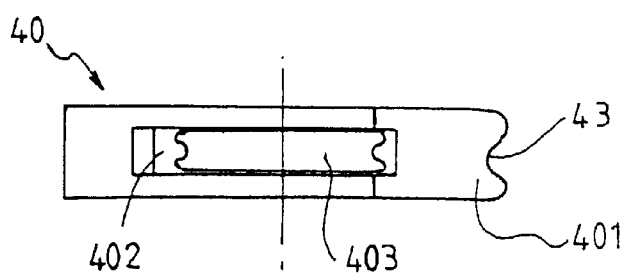
FIG. 10B is a topview of the stop-fitted pulley of FIG. 10A.

FIGS. 10A and 10B show a stop pulley 405 which is mounted at the lower end of a rail 21, 22 in another embodiment of the invention. In this new embodiment, the stop pulley 405 consists of a part 401 in the form a half disk substantially identical with the stop pulley 40 of the FIGS. 6 and 7. Therefore this half disk 401 also comprises a rest surface 421 and a stop surface 411. Accordingly the half disk 401 acts as a stop for the slider 30. The half disk 401 comprises a longitudinal seat 402 situated substantially at its center to receive a conventional pulley 403. The conventional pulley 403 assumes the shape of a disk having a transverse borehole 404. The half disk 401 comprises a transverse borehole into which is inserted an rod (not shown) to affix the stop pulley 405 to the module. The pulley 403 is mounted in freely rotatable manner on the affixation rod inside the half disk 401. Thereby the axis of rotation of the pulley 403 is perpendicular to the longitudinal sides of the half disk 401. Furthermore the half disk 401 is fitted with a recess 431 substantially following the contour of the half disk 401 from the edge of the stop surface 411 as far as into the seat 402 for the pulley 403. The recess 431 is provided for the cable 35A transmitting the lowering forces acting on the slider 30. The cable 35A comes from the slider 30 and runs inside the recess 431 of the half disk 401 then passes over the pulley 403 housed in the half disk 401. Therefore, when the slider 30 is moving, the cable 35A slides in the half disk 401 and drives the pulley 403 into rotation. The scope of the invention also covers other means affixing the stop pulley 405 to the module.

In the above described embodiment, the sliders 30, 31 contain springs 330 that cancel play and reset cable length when the window is displaced. In another variation of the invention, the sliders 30, 31 are without springs. In such a design, the cables 35A, 35B for instance of the bowden type are fitted with a known sheath. In that case the sheath sub-assembly comprises known means in the vicinity of the drive motor 36 to cancel play.

Figure 11:
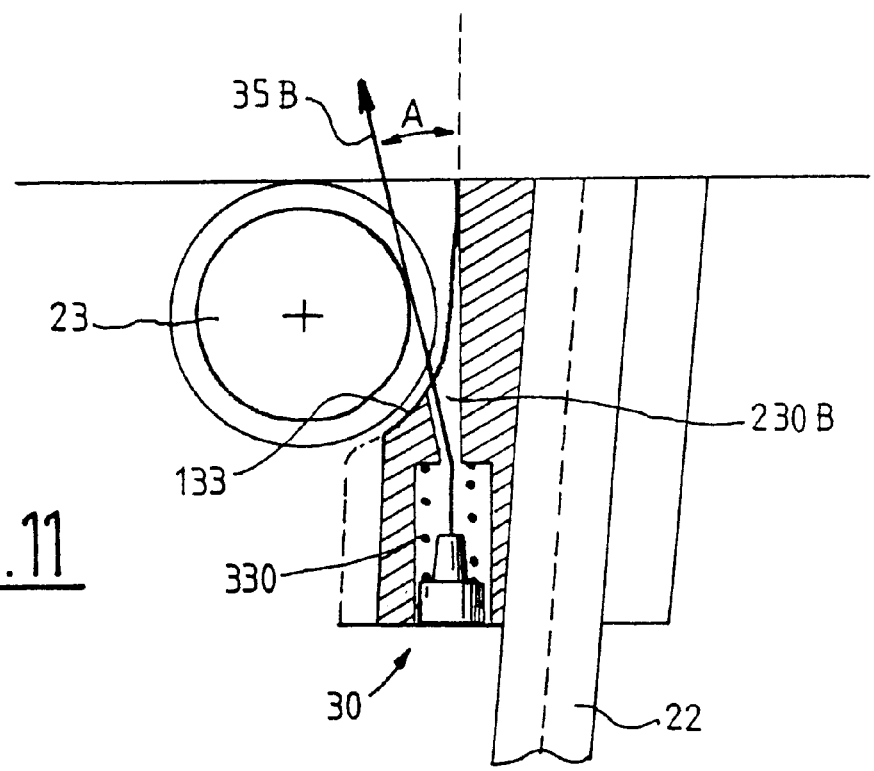
FIG. 11 is a sectional view of an embodiment variation of the sliders of the invention in an upper stopped position.

FIG. 11 is a cross-section of an advantageous embodiment variation of the design of the sliders 30, 31 of the invention, the slider 30 being shown in its upper stop position. Elements identical with those described above are denoted by the same reference numerals. The slider 30 of the variation of FIG. 11 comprises a lateral recess 133 for the upper pulley 23 when the slider arrives at the upper stop. The recess 133 allows reducing the gap between the upper pulley 23 and the slider 30, 31 when in the upper stop position, also to reduce the gap between the pulley 23 and the rail 21, 22. In this manner the torque effect caused by tensioning the lifting cable 35B is averted, and the cable tension, which is the motor tension, may assume values between 12 and 16 daN. Thanks to this advantageous design, the angle A subtended by the end positions of the lifting cable 35B between the high and low positions of the slider 30, 31 will at most be 150. For that purpose the shape of the conduit 230B passing the cable 35B is made to match to allow different slopes of the cable 35B. Moreover, the slider 30, 31 can be without the spring 330 cancelling play at the end of the lifting cable 35B.

In regards to all embodiments of the sliders 30, 31, the lifting cable 35B preferably shall be connected to the lower part of the slider 30, 31 whereas the lowering cable 35A is attached to the upper part of the slider 30, 31. In this manner the effectiveness of translating the sliders 30, 31 on the rails 21, 22 will be improved.

In another embodiment variation of the invention, the module 20 is without plastic rails molded of one piece with the module 20. In such a case metal rails may be mounted in known manner on the module 20. Illustratively the cross-sectional shape of the metal rails will be an S. Advantageously the rails then are mounted on the shaft 123 of the pulleys 23, 40, the shafts being affixed to the sheetmetal of the motor-vehicle door. The metal rails in particular allow improving dimensional stability of the assembly and offer improved sliding of the sliders 30, 31.

Clearly other modifications may be introduced by the expert that shall fall within the scope of the invention.

What is claimed is:

1. A window-regulator module for a window in a door of a motor vehicle, said window-regulator module comprising:
   at least one slider being slidable on a rail fixed to a panel, said slider having a lower edge and for supporting the window,
   driving means for driving the slider, the driving means connected to an upper end of the slider and to a lower end of the slider,
   wherein the at least one slider is monolithically formed as a single piece and includes a sliding part complementary to the rail and wherein the lower end of the slider includes a portion for holding and affixation of the window,
   and wherein at the lower end of the stroke of the at least one slider, the lower end of the slider projects by a specified distance beyond a lower end of the rail.

2. The window-regulator module as claimed in claim 1, wherein the panel and the rail are made of one molded plastic piece.

3. The window-regulator module as claimed in claim 1, wherein the at least one slider includes two two panel side walls connected at lower ends thereof, by a supporting surface to form a substantially U-shaped cross-sectional configuration, the window being adapted to be vertically housed between the two panel side walls of said slider, a lower edge of the window being adapted to rest on said supporting surface of said slider, one of said two panel side walls comprising a vertical channel, and an upper end of said one of said two panel side walls defining a step.

4. The window-regulator module as claimed in claim 3, wherein the at least one slider comprises two seats, one for a lowering cable of the driving means and the other for a lifting cable of the driving means, the seat for the lifting cable being fitted with elastic means for adjusting for play in said driving means, said elastic means cooperating with an end of the lifting cable when the at least one slider is pulled toward a top of the rail.

5. The window-regulator module as claimed in claim 4, wherein the seats for the lowering and lifting cables are respectively present in the step of the slider and in said one of said two panel walls, each of the two seats being located in a plane substantially perpendicular to the side walls of the slider.

6. The window-regulator module as claimed in claim 5, wherein each of the seats has a hole continued by an issuing conduit of a dimension corresponding to that of a respective one of the cables, each of the seats comprising a shoulder formed at a junction of the hole and the conduit of said seat, the elastic means comprising a compression spring placed in the hole of the seat of the lifting cable, each cable extending through a respective one of the conduits, the lowering cable being fitted at one end with a part hitting the seat of the lowering cable when the lowering cable is pulled downward, and the lifting cable being fitted at the end with a part formed by a body continued by a head, an annular junction between the body and the head of the part of the end of the lifting cable compressing the spring in the hole of the lifting cable seat, driving the slider upward on the rail.

7. The window-regulator module as claimed in claim 3, wherein the driving means comprises at least one cable connected to said slider, said at least one cable being fitted with a spring for elastically adjusting for in said driving means play.

8. The window-regulator module as claimed in claim 1, wherein said module further comprises a damping stop near the lower end of said rail.

9. The window-regulator module as claimed in claim 8, wherein the damping stop includes a transverse borehole, the damping stop being rotatable about an affixation rod inserted into the borehole, the damping stop comprising a damping stop surface situated near the lower end of the rail, a lower end of a step of the slider is movable to impact the damping stop surface.

10. The window-regulator module as claimed in claim 9, wherein the module further comprises elastic means cooperating with the damping stop for opposing rotation of the damping stop in a direction corresponding to a downward motion of the slider.

11. The window-regulator module as claimed in claim 10, wherein the module comprises limiting means for limiting the rotation of the damping stop in a direction opposite that corresponding to the downward motion of the slider.

12. The window-regulator module as claimed in claim 10, wherein the damping stop comprises a rest surface and wherein the elastic means comprises a compression spring exerting a pressure on the rest surface of the damping stop in such manner as to urge the damping stop surface toward a top of the rail and to oppose the rotation of the damping stop in said direction.

13. The window regulator module as claimed in claim 12, wherein the damping stop comprises a lower pulley.

14. The window-regulator module as claimed in claim 13, wherein a peripheral surface of the damping stop is curved and includes a notch which follows the curve of the damping stop and is situated in a plane substantially parallel to a plane in which said slider moves.

15. The window-regulator module as claimed in claim 13, wherein the damping stop comprises a seat within which said lower pulley is rotatably mounted, the damping stop includes a notch for a cable transmitting lowering forces to the slider, the cable sliding in the notch of the damping stop and then passing over the lower pulley seated in the damping stop.

16. The window-regulator module as claimed in claim 10, wherein the elastic means comprises a compression spring with one end engaging a stop of the module and the other end engaging the damping stop.

17. The window-regulator module as claimed in claim 1, wherein the upper end of the slider includes a step to meet a stop at the lower end of the rail.

18. The window-regulator module as claimed in claim 1, wherein the rail is metallic and is adapted to be mounted to the door by shafts of pulleys.

19. The window-regulator module as claimed in claim 1, wherein the driving means comprises at least one cable connected to said slider, the driving means including a motor for driving the cable, the slider being fitted with elastic means for adjusting for play in said driving means.

20. The window-regulator module as claimed in claim 19, wherein the slider comprises a lateral recess allowing a gap to be reduced between an upper pulley of the driving means and the slider as well as a gap between the upper pulley and the rail in such manner as to limit a torque effect caused by tensioning the cable.

21. The window regulator module as claimed in claim 19 wherein the at least one cable comprises a lifting cable connected to the lower end of the slider and a lowering cable connected to the upper end of the slider.

22. The window-regulator module as claimed in claim 19, wherein said slider comprises two side walls connected at lower ends thereof by a supporting surface to form a substantially U-shaped structure, the window being adapted to be vertically housed between said two side walls of said slider, a lower edge of the window being adapted to rest on the supporting surface of the slider, an upper end of one of the slider side walls defining a step and said one of the slider side walls including a channel constituting the sliding part of said slider.

23. The window-regulator module as claimed in claim 19, wherein said at least one cable is a sheathless cable.

* * * * *